United States Patent

[11] 3,578,351

[72] Inventor Regis Aloysius McAtee
R.D. 5, Box 356, Latrobe, Pa. 15650
[21] Appl. No. 814,679
[22] Filed Apr. 9, 1969
[45] Patented May 11, 1971

[54] AUXILIARY SLIDE MEMBER FOR MOUNTING ON SLED RUNNER
14 Claims, 14 Drawing Figs.

[52] U.S. Cl. ..................................................... 280/28
[51] Int. Cl. ............................................. B62b 17/02
[50] Field of Search .......................................... 280/12, 28, 11.12

[56] References Cited
UNITED STATES PATENTS

| | | | |
|---|---|---|---|
| 302,762 | 7/1884 | Morrell | 280/28 |
| 954,377 | 4/1910 | Bystrom | 280/28 |
| 2,016,187 | 10/1935 | Vincent | 280/28 |
| 2,095,951 | 10/1937 | Andrus | 280/28 |
| 2,404,402 | 7/1946 | Porter | 280/28 |
| 2,453,767 | 11/1948 | Thompson | 280/28(X) |
| 2,824,746 | 2/1958 | Schummer | 280/28 |
| 3,014,731 | 12/1961 | Dworak | 280/28(X) |
| 3,120,963 | 2/1964 | Seckel | 280/28 |

Primary Examiner—Benjamin Hersh
Assistant Examiner—Leslie J. Paperner
Attorney—Melvin A. Crosby ABSTRACT: The invention relates to an auxiliary slide member for mounting on a sled runner, characterized in that the slide member has substantially greater width than the sled runner and is flexible so as to conform to the contour of the sled runner, and has a channel formed on top for receiving the sled runner, whereby the auxiliary member can be telescoped over the sled runner from the back and then fixed thereto.

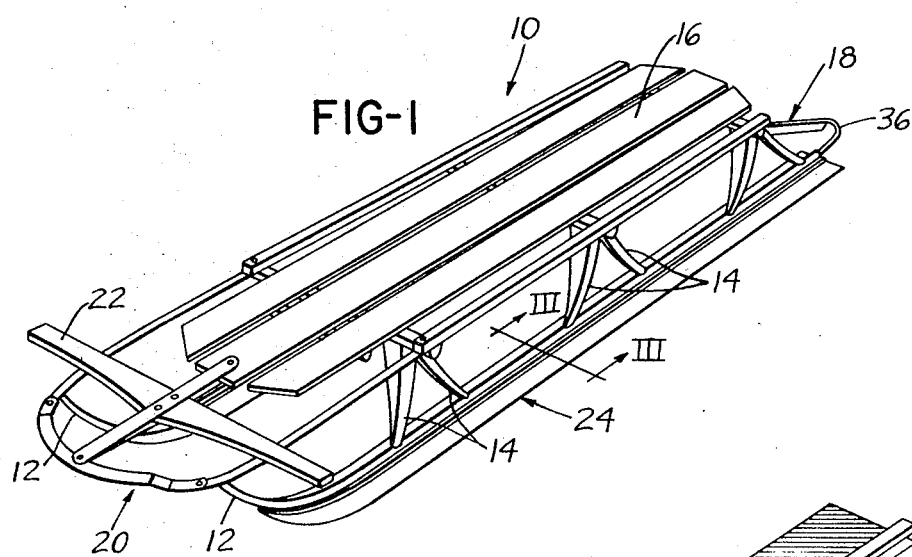
FIG-1
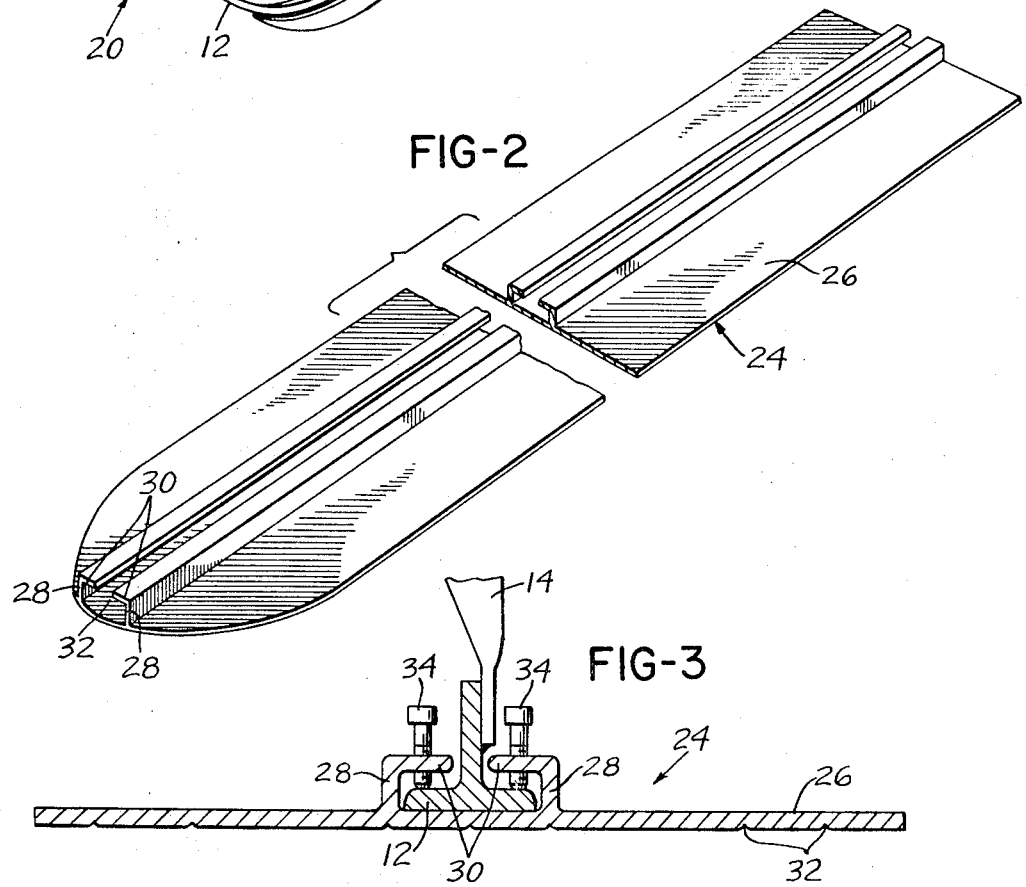
FIG-2
FIG-3
FIG-4
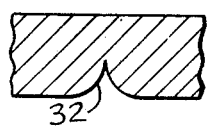
INVENTOR
REGIS A. McATEE
BY Patented May 11, 1971
3,578,351
2 Sheets-Sheet 2
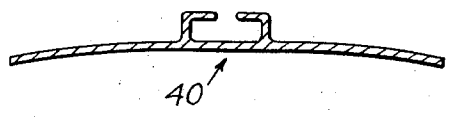
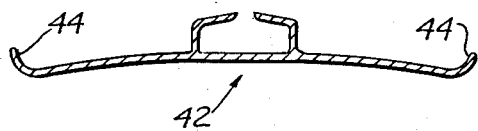
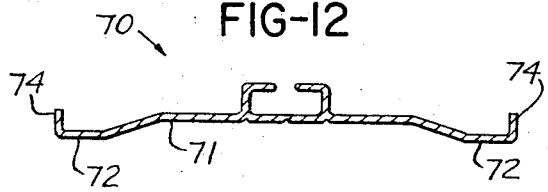
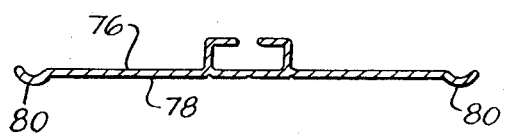
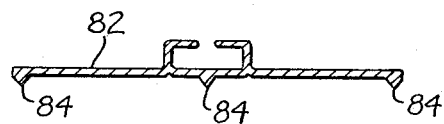
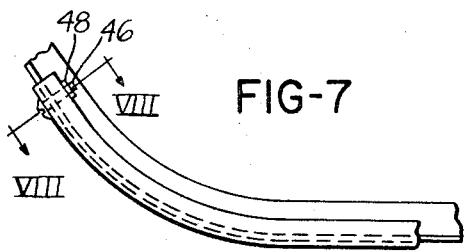
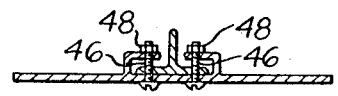
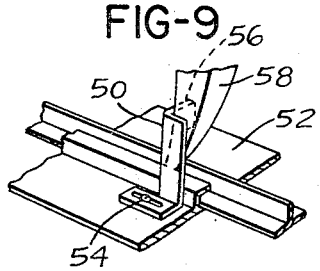
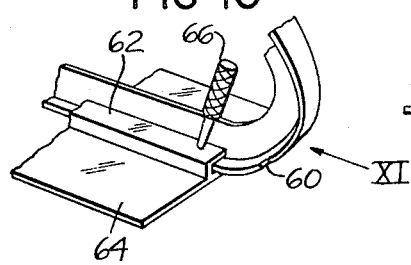
INVENTOR
REGIS A. McATEE
BY
Melvin A. Crosby

AUXILIARY SLIDE MEMBER FOR MOUNTING ON SLED RUNNER

The present invention relates to an auxiliary runner or slide member especially adapted for use in connection with sleds and like devices which are adapted for sliding on runners on snow-covered areas.

Sleds, of course, are well known and consist of a platform having runners dependent therefrom adapted to slide on snow-covered areas. The runners on sleds are customarily relatively narrow, because it is intended for the sled to be used on relatively hard packed snow. However, it is many times the case that the snow is relatively light and soft and that the opportunity does not present itself to form a hard packed region where sleds can be employed.

With the foregoing in mind, the present invention proposes the provision of an auxiliary runner or skid member, or slide, adapted for attachment to the conventional runners of sleds and which attached member presents a substantially greater load bearing area than the conventional runner, whereby the sled can be used on light or soft unpacked snow.

A primary objective of the present invention is, therefore, the provision of an auxiliary runner or skid member, or slide, of the nature referred to above.

A still further object of the present invention is the provision of a member of the nature referred to, which is quite inexpensive and which is easy to attach and to remove from the runners of conventional sleds.

A still further object of this invention is the provision of a member of the nature referred to and adapted for connection with the runner of a sled which is flexible enough to conform to the contour of the sled runner and which will permit lateral flexing of the runners when mounted on the runners of sleds which have steering mechanisms connected thereto.

A still further object is the provision of an auxiliary runner, or skid member, or slide, which is adapted for use with substantially any type of sled.

The foregoing objects, as well as still other objects and advantages, of the present invention will become more apparent upon reference to the following specification, taken in connection with the accompanying drawings, in which:

FIG. 1 is a perspective view of a sled having auxiliary runners, or slide members according to the invention, mounted on the runners thereof;

FIG. 2 is a perspective view drawn at enlarged scale, and with the central portion broken away showing the auxiliary member as it appears before mounting on the sled runner;

FIG. 3 is a transverse section indicated by line III-III on FIG. 1, showing one manner of attaching the auxiliary member to the sled runner;

FIG. 4 is a fragmentary section showing the manner in which longitudinal groove means can be formed in the underside of the auxiliary member;

FIG. 5 is a transverse section showing an auxiliary member according to the present invention, which is formed so as to be concave downwardly;

FIG. 6 is a view like FIG. 5, but shows how the member can be formed so as to be concave downwardly, but with its lateral extremities turned upwardly somewhat;

FIG. 7 is a fragmentary view showing the forward portion of a sled runner with an auxiliary member according to the present invention mounted thereon, and held in place by a screw up near the front extremity of the auxiliary member;

FIG. 8 is a section indicated by line VIII-VIII on FIG. 7;

FIG. 9 is a fragmentary perspective view illustrating the use of a hooklike member to connect the auxiliary member with the supports for the runner on which the auxiliary member is mounted;

FIG. 10 is a fragmentary perspective view showing a manner in which the auxiliary members according to the present invention could be secured to the sled runner by staking them into position;

FIG. 11 is a view looking in the direction indicated by the arrow 11 on FIG. 10, showing notches cut out of the sled runner at the back end and which permit assembly of the auxiliary member with the sled runner, and also illustrating the staking operation referred to; and FIGS. 12, 13 and 14 show modified shapes for the auxiliary member.

Referring to the drawings somewhat more in detail, in FIG. 1, reference numeral 10 generally indicates a sled of more or less conventional type having runners 12 therebeneath, and which runners are connected to the lower ends of supports 14, the upper ends of which are connected to the sled platform 16. The runners 12 in FIG. 1, at the rear ends thereof, curve upwardly and then forwardly, as indicated at 18. At their front ends, the runners curve generally upwardly for connection with a steering mechanism, generally indicated at 20, and including a manually operable crossbar 22, which is manipulated in a known manner to flex the runners 12 laterally and thereby steer the sled.

Each runner 12 in FIG. 1, has an auxiliary member 24 according to the present invention connected thereto and extending from near the rear end of the respective runner completely to, or nearly to, the front end of the runner.

As will be seen in FIG. 2, each auxiliary member 24 comprises a lower relatively broad runner portion 26 adapted for resting of the surface on which the sled bears so as substantially to increase the bearing area of the sled on the surface. This permits the sled to be used on soft, or unpacked snow and greatly increases the utility of the sled over what is the case when the sled must depend on the relatively narrow conventional runners for support.

Upstanding from runner portion 26 on opposite sides of the longitudinal centerline thereof are rib members 28 and from the upper ends of rib members 28 there extend horizontally, and toward each other, the flanges 30, which define therebetween a slot 32. The auxiliary member 24, constructed in the manner described, is adapted for being slidably engaged over a runner 12 of the sled from the rear and then pressed or driven forwardly into the position occupied by the runners in FIG. 1. It will be evident that the auxiliary member must curve upwardly at the front and follow the outline of the sled runner in order to form an operative assembly.

I have found that the auxiliary member according to the present invention can be in the form of an extrusion, aluminum for example, of about one-sixteenth inch section throughout and that this will permit the auxiliary member readily to conform to the contour of the sled runner without any difficulty whatsoever. Furthermore, the sled runners can still be flexed laterally to a substantial degree for carrying out steering operations and the auxiliary members 24 will flex to a certain degree in the lateral direction.

The underside of runner portion 26 of auxiliary member 24 is preferably provided with a plurality of laterally spaced longitudinal grooves in FIG. 4, which improve the sliding characteristics and lateral stability of the runner portion of the auxiliary member on the surface therebeneath.

As will be seen in FIG. 3, clamp screws 34 could be provided extending through the flanges 30 so as to clamp the auxiliary member to the respective sled runner 12. As will be seen hereinafter, however, another method of attaching the auxiliary member to the sled runner suggests itself, which is somewhat more inexpensive than the attaching means shown in FIG. 3.

As will be seen in FIG. 1, the runners 12 include narrow portions 36 at the rear ends which permit the auxiliary members to be introduced over the runners so that the wide load bearing portions of the runners 12 will be received under the flanges 30. The runners 12 are generally T-shaped in cross section, as will be seen in FIG. 3, and the support members 14 may be riveted or welded or otherwise secured to the leg of the T-shaped runners.

It is of advantage for the auxiliary members 24 to be tapered at their forward ends, as indicated at 38 in FIG. 2, so that there are no corners projecting from the front ends of the auxiliary members that might be dangerous when the sled is in use.

FIG. 5 shows an auxiliary member of the same nature as that illustrated and described, except the underside of the auxiliary member is concave downwardly, as indicated by arrow 40, which will improve the operation of the auxiliary member, particularly in extremely light and soft snow. The concave configuration of the auxiliary member shown in FIG. 5 imparts stability to the sled having the auxiliary members thereon because it reduces any tendency of the sled to slide in a direction laterally of the length of the runners.

In FIG. 6, an auxiliary member is illustrated which is concave on the underside, as indicated at 42, but which also has its lateral edges turned upwardly as indicated at 44. The auxiliary member shown in FIG. 6 will operate at about the same as the auxiliary member shown in FIG. 5, but has somewhat less tendency to cut through the snow and engage the surface beneath the snow.

FIGS. 7 and 8 show a manner in which the auxiliary member can be more or less permanently attached to its respective sled runner, if so desired. In these FIGS. it will be seen that holes are drilled through the auxiliary member and the sled runner and bolts 46 having nuts 48 inserted therethrough. When the nuts 48 are drawn up tight on bolts 46, the auxiliary member will be fixedy secured to the sled runner.

FIG. 9 shows how brackets 50 could be connected to the auxiliary member 52 as by screws 54 with the brackets including a flange 56, engaging the front of one of the respective runner supports 58. This arrangement will also retain the auxiliary member in position on the runner.

A number of sleds are formed with the T-formation of the runner extending along the turned up back end part of the runner. The auxiliary members according to the present invention can readily be mounted on such runners, as shown in FIGS. 10 and 11, by cutting notches 60 in the lateral web of the runner at the back end at a level which will receive the flanges 62 of the auxiliary member 64. The auxiliary member can be introduced over the runner by availing of the slots 60 and either pressed or driven forwardly along the runner to the desired position. Thereafter, the auxiliary member can be secured to the runner in any suitable manner.

A particularly advantageous manner of securing the auxiliary member to the runner consists of bending one or both of flanges 62 down as by availing of a punch 66 and driving the punch downwardly by a blow from a hammer 68. This will bend the flanges 62 downwardly. as shown at 62a in FIG. 11, and lock the auxiliary members in place on their respective runners.

In the drawings, a substantial clearance has been shown for the runner in the T-shaped channel formed by the ribs 28 upstanding from the back of runner portion 26 and the flanges 30 extending toward each other from the upper ends of rib portions 28. It will be understood, however, that the channel formed for receiving the runner could be made so as to receive the runner relatively closely, thereby supporting the auxiliary member on the runner without any substantial freedom of movement thereon. However, in case the sled runner was of such a size that substantial clearance did exist in the slot provided therefor, this could readily be taken up by staking the flanges 30 inwardly and downwardly against the runner at several points along the length of the auxiliary member.

It will be appreciated, that the auxiliary slide member according to the present invention is quite inexpensive to produce and that it is relatively simple to apply to a sled and that, inasmuch as it is in the form of a single piece, the problems of connecting the auxiliary member to the sled runners are simplified, and the problem of any joints along the auxiliary member is entirely eliminated.

It will be evident that the auxiliary slide member of the present invention is adapted for being incorporated with sleds when newly manufactured, or it can be sold separately from sleds for use therewith and, when thus sold, can be used with new sleds to adapt them to conditions where the conventional sled runners will not adequately support the sled and can also be employed for renewing the runners of sleds which have become worn, or rusted, or otherwise ineffective.

Aluminum has been referred to as a suitable material from which the auxiliary members can be made but other materials, such as reinforced plastic or the like, could also be employed.

FIG. 12 shows an auxiliary member 70 having a central recess 71 with runner portions 72 at the sides having turned up outer edges 74. This member gives good support and good guiding on soft snow and on hard snow will rest on runner portion 72 and offer reduced resistance.

FIG. 13 shows an auxiliary member 76 having a flat bottom 78 with heads 80 along the side edges. This member will give support and guiding on soft snow and on hard snow or ice heads 80 will provide low resistance sliding support.

FIG. 14 shows an auxiliary member 82 having sharp ribs 84 on the bottom which help guiding in soft snow and give low resistance support on ice. Further ribs 84 will bite into hard surfaces and give good guiding and stability thereon.

Modifications can be made within the scope of the appended claims.

I claim:

1. A one-piece slide member adapted for mounting on a sled runner which has a lower horizontal portion and a central rib upstanding from the center of the horizontal portion, said runner forming a part of a sled which has a deck and the runner supported beneath the deck by support elements extending downwardly from the deck to the said rib of the runner, said runner having an upwardly curving front portion and a straight portion leading rearwardly from said front portion; said slide member being adapted to increase the bearing area of the sled runner: said slide member comprising an uninterrupted runner portion substantially wider than the lead runner on which it is to be mounted and formed straight and of such a length as to extend from near the rear end of the sled runner to and a substantial distance along said front portion thereof when in mounted position on said sled runner, said slide member also comprising laterally spaced rib means extending upwardly from the side of the runner portion which faces the sled and arranged in parallel relation on opposite sides of the longitudinal centerline of said runner portion, said rib means extending the full length of said runner portion and adapted to be disposed on opposite sides of the sled runner, flange means on the upper ends of said rib means extending the full length of said rib means and also extending toward each other adapted to engage over the top of the sled runner and terminating in laterally spaced relation to provide a space to receive the said rib of the sled runner and any portion of said support elements disposed between said flange means whereby said slide member can be mounted on a sled runner by driving it on the sled runner endwise from the rear end of the sled runner, said slide member having sufficient stiffness against bending upwardly in the regions thereof projecting laterally from the sled runner to support loads imposed upon the sled while being sufficiently flexible in the longitudinal direction as to conform to the contour of said front portion of the sled runner when driven thereon from the rear end of the sled runner into said mounted position thereon, said rib means and flange means being formed integrally with said runner portion.

2. A slide member according to claim 1 in which said slide member is a metal extrusion.

3. A slide member according to claim 1 in which said slide member is nonmetallic.

4. A slide member according to claim 1, in combination with a sled having a runner which turns upwardly at the rear, the sides of said runner at the turned up rear end thereof being notched at a level to receive said flange means to permit said member to be slid over said runner from the rear end of the runner, and at least one of said flange means being deformed forwardly of said notch after the member is in position on the sled runner to fix the member to the sled runner.

5. A slide member according to claim 1 in which said runner portion of said slide member in width is a multiple of the width of said sled runner.

6. A slide member according to claim 5 in which said runner portion tapers inwardly at the sides from a point therealong near the front end toward the front end thereof.

7. A slide member according to claim 5, in which said runner portion on the side facing away from the sled is longitudinally grooved.

8. A slide member according to claim 5, in which the side edges of said runner portion curve upwardly.

9. A slide member according to claim 5, in which said runner portion has longitudinal ridges thereon projecting outwardly from the side facing away from said sled runner.

10. A slide member according to claim 9, in which said ridges are sharp at their outermost edges.

11. A slide member according to claim 5, in which said runner portion in lateral cross section is concave in a direction away from said sled.

12. A slide member according to claim 8, in which the side edges of said runner portion curve upwardly.

13. A slide member according to claim 11, in which said runner portion has longitudinal ridges thereon projecting outwardly from the side facing away from said sled runner.

14. A slide member according to claim 13, in which said ridges are sharp at their outermost edges.